United States Patent [19]

Tang

[11] Patent Number: 5,616,840
[45] Date of Patent: Apr. 1, 1997

[54] METHOD FOR ESTIMATING THE HYDRAULIC CONDUCTIVITY OF A BOREHOLE SIDEWALL FRACTURE

[75] Inventor: Xiaoming Tang, Sugar Land, Tex.

[73] Assignee: Western Atlas International, Houston, Tex.

[21] Appl. No.: 624,026

[22] Filed: Mar. 27, 1996

[51] Int. Cl.⁶ .................................................. E21B 49/00
[52] U.S. Cl. ................................. 73/152.05; 73/152.16; 367/31
[58] Field of Search ........................... 73/152.05, 152.16; 367/31

[56] References Cited

U.S. PATENT DOCUMENTS

| | | | |
|---|---|---|---|
| 4,131,875 | 12/1978 | Ingram | 367/35 |
| 4,543,648 | 9/1985 | Hsu | 367/29 |
| 4,672,588 | 6/1987 | Willen | 367/28 |
| 4,683,556 | 7/1987 | Willis | 367/27 |
| 4,683,557 | 7/1987 | Willis | 367/57 |
| 4,703,460 | 10/1987 | Kurkjian | 367/31 |
| 4,779,236 | 10/1988 | Sondergeld | 367/31 |
| 4,791,619 | 12/1988 | Liu | 367/35 |
| 4,797,668 | 1/1989 | Zimmer | 340/855.6 |
| 4,797,859 | 1/1989 | Hornby | 367/31 |
| 4,799,200 | 1/1989 | Cheung | 367/30 |
| 4,809,236 | 2/1989 | Hsu | 367/28 |
| 4,817,059 | 3/1989 | Hornby | 367/28 |
| 4,831,600 | 5/1989 | Hornby et al. | 367/31 |
| 4,869,338 | 9/1989 | Wiggins | 181/106 |
| 4,870,627 | 9/1989 | Hsu et al. | 367/69 |
| 4,888,740 | 12/1989 | Brie et al. | 367/30 |
| 4,964,101 | 10/1990 | Liu et al. | 367/31 |
| 5,047,991 | 9/1991 | Hsu | 367/25 |
| 5,077,697 | 12/1991 | Chang | 367/31 |
| 5,081,611 | 1/1992 | Hornby | 367/25 |
| 5,124,952 | 6/1992 | Knize | 367/34 |
| 5,265,067 | 11/1993 | Chang | 367/31 |
| 5,278,805 | 1/1994 | Kimball | 367/32 |
| 5,331,604 | 7/1994 | Chang | 367/31 |
| 5,475,650 | 12/1995 | Sinha et al. | 367/31 |
| 5,485,431 | 1/1996 | Johnson | 367/30 |

OTHER PUBLICATIONS

Tang, X.M., and Cheng, C.H.; Borehole Stoneley Wave Propagation Across Permeable Structures, Geophysical Prospecting 41, pp. 165–187 (1993).

*Primary Examiner*—Hezron E. Williams
*Assistant Examiner*—Jay L. Politzer
*Attorney, Agent, or Firm*—William A. Knox

[57] ABSTRACT

A method for modeling fracture zones in the sidewall of a borehole and for estimating the hydraulic conductivity thereof. The method first separates Stoneley wavefields into a directly-transmitted wavefield and a one-way (i.e. downgoing) reflected wavefield from which the depth configuration may be determined. The separated wavefields are corrected for the effects of borehole irregularity due to such effects as washouts and the like by numerically modeling Stoneley wave propagation using caliper and slowness measurements. The hydraulic conductivity is estimated from parameters derived from synthetic and measured Stoneley-wave data across the fracture zone in combination with measurements of the borehole radius.

4 Claims, 9 Drawing Sheets

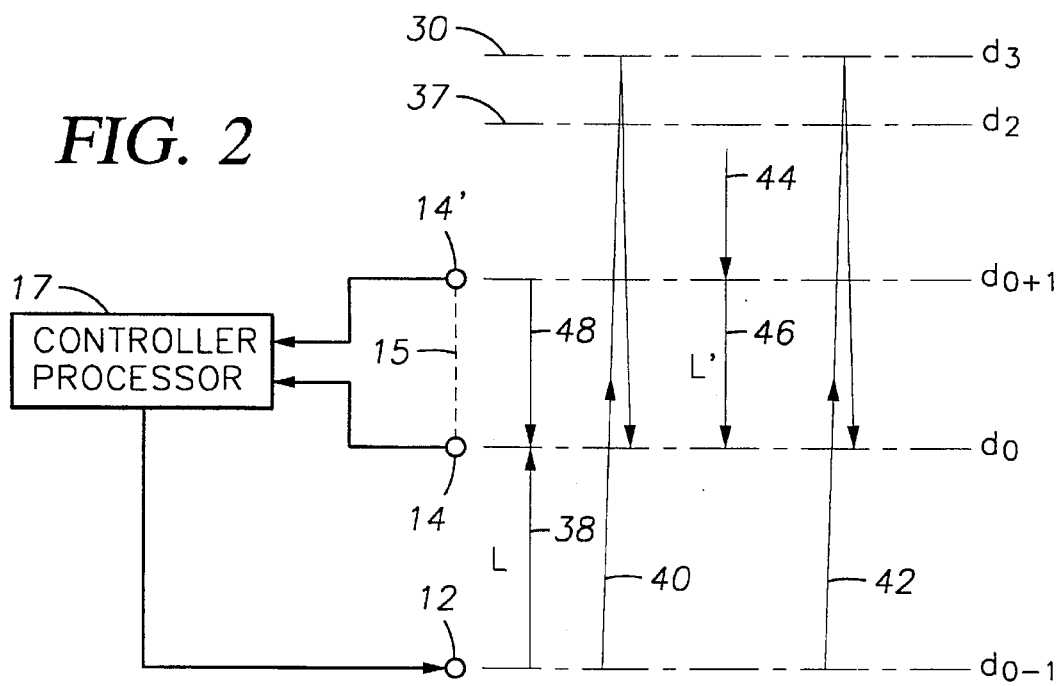
FIG. 2
FIG. 3
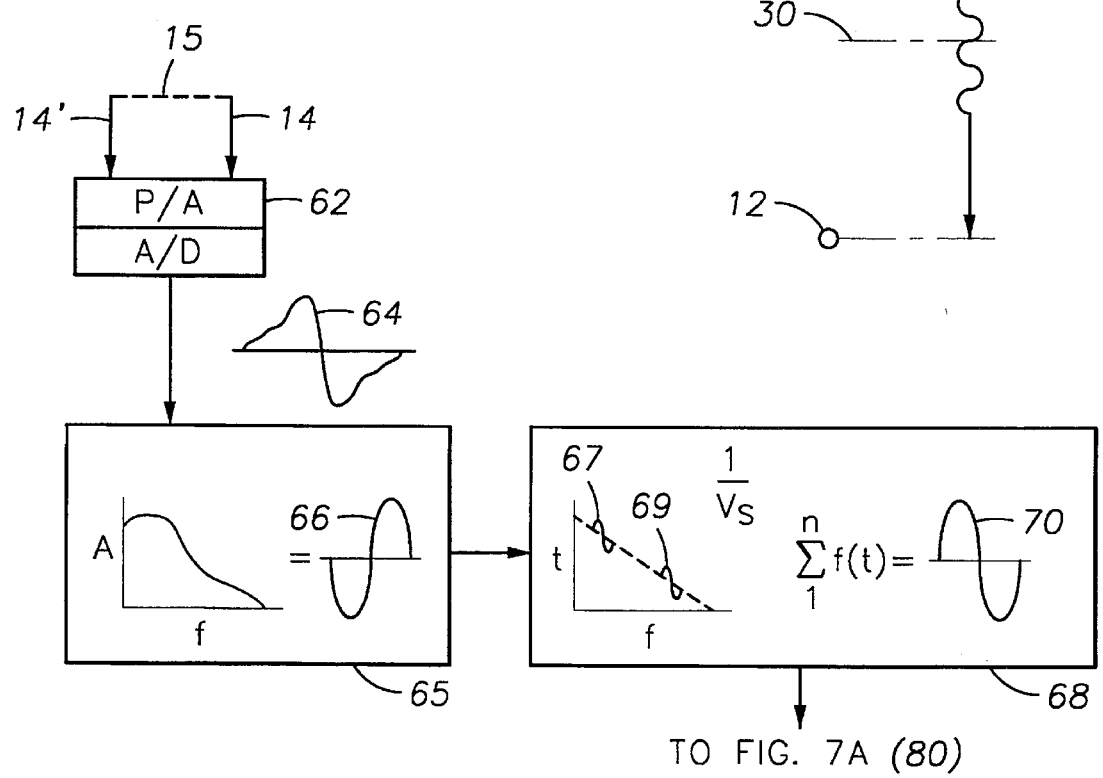
FIG. 6

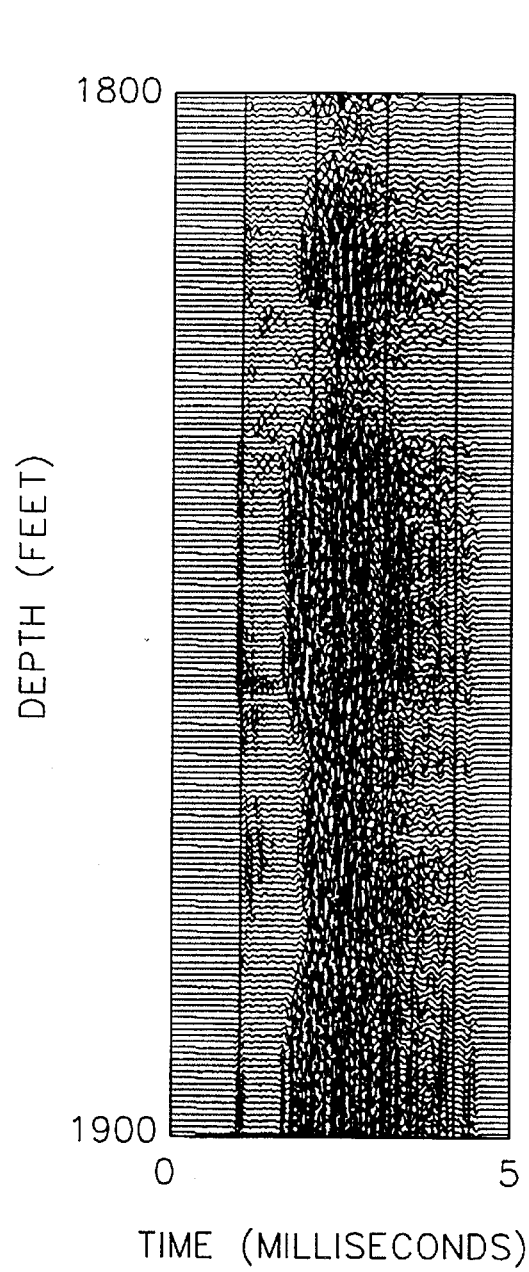
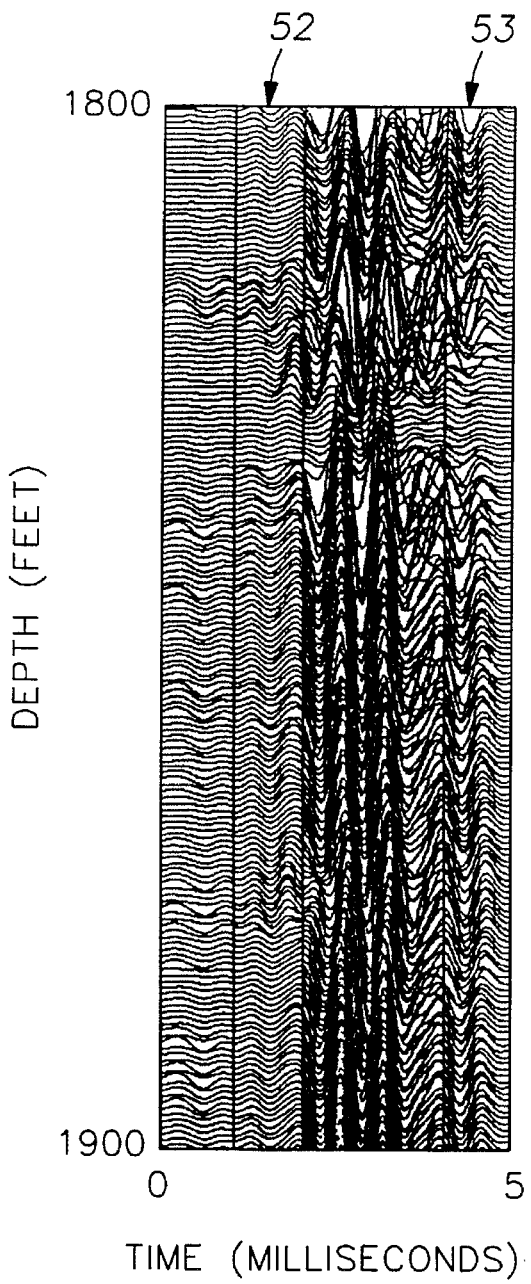
*FIG. 4A*  *FIG. 4B*

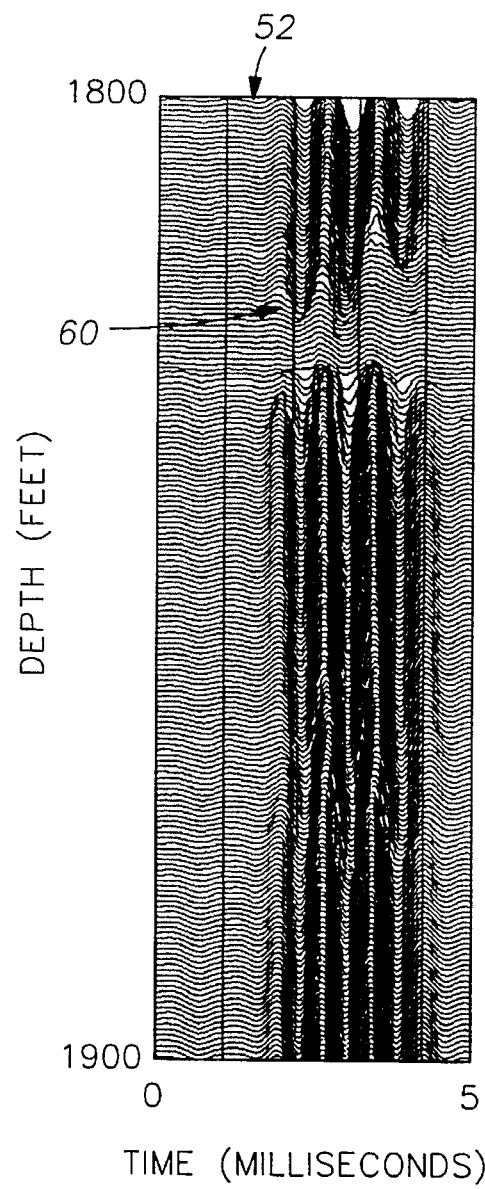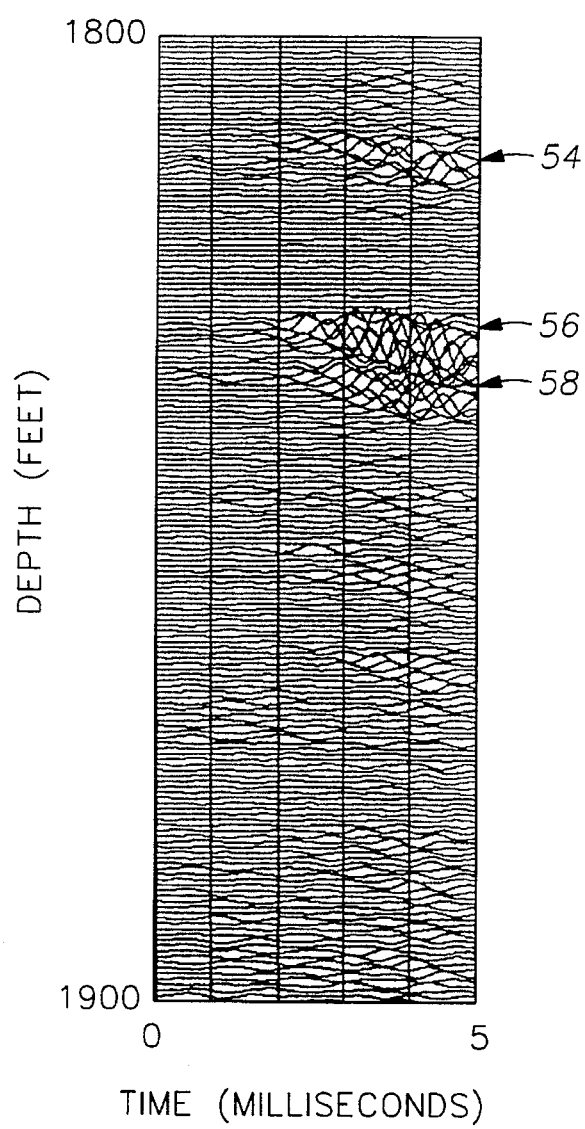
*FIG. 5A*  *FIG. 5B*

METHOD FOR ESTIMATING THE HYDRAULIC CONDUCTIVITY OF A BOREHOLE SIDEWALL FRACTURE

BACKGROUND OF THE INVENTION

1. Field of the Invention

A method for estimating the hydraulic conductivity of a fracture zone in the sidewall of a borehole by use of transmitted and reflected Stoneley waves propagating in the annulus between an acoustic logging tool and the borehole sidewall.

2. Discussion of Related Art

Boreholes may be drilled the earth for the purpose of exploiting buried natural resources. Solid, water-soluble minerals such as certain sodium and potassium salts are mined by injecting water, dissolving the material and pumping the resulting brine to the surface. Non-soluble material such as sulphur may be melted using hot water and then pumped to the surface for processing. Fluidic resources such as steam, water, oil or gas usually migrate naturally into the well bore whence a desired fluid phase may be pumped to the surface for storage and distribution. Scavenging of hydrocarbon fluids by water injection may be used sometimes in the presence of a depleted reservoir formation.

The radial fluid migration from a homogeneous formation into the wellbore, or the reverse, is a function of the formation porosity, $\phi$, measured in percent, the permeability, $\kappa$, measured in darcies (m$^2$, a measure of the inter-pore communication), the fluid viscosity, $\mu$ in Pascal-seconds (Pa.s), the pressure difference $\Delta p$ in pascals (Pa) between the formation pore pressure and the hydrostatic pressure in the wellbore fluid and the vertical extent (thickness, H) of the zone of interest. As will be seen later, the critical parameter with respect to volumetric flow is hydraulic conductivity, Q, where $Q=(\kappa_0 H/\mu)\Delta p$.

Formation fracture zones that intersect the borehole sidewall provide very significant conduits for radial fluid-flow intercommunication between the formation and the well bore. An open fracture increases the effective area exposed to the sidewall of the borehole thereby to increase the fluid interchange aperture between formation and borehole.

Fracturing associated with a reservoir containing a desired fluid enhances the volumetric recovery rate of the fluid. On the other hand, in an open hole through a barren formation, a fracture zone may result in serious leakage from the borehole into the formation, of the product being pumped up the borehole. In either case, it is useful to know the location and fluid-conducting capability of a fracture zone so that appropriate steps may be taken either to exploit the presence of the fracture zone to enhance product recovery or to seal off the fracture zone to reduce product loss.

The composition and texture of the borehole rocks are measured using an instrumented logging sonde that is lowered into the wellbore on the end of a cable. The data gathered by the downhole instruments are transmitted via suitable communication channels in the cable to data-processing and data-storage devices on the surface. Exemplary logging tools include, but are not limited to, borehole televiewers, induction loggers, resistivity logs, self-potential logs, gamma ray logs, neutron logs, velocity logs and various forms of acoustic loggers.

Acoustic logging methods may include use of compressional waves, shear waves, flexural waves and tube or Stoneley waves. In the study of formation fracture zones that intersect the borehole sidewall, use of Stoneley waves is preferred. As is well known, Stoneley waves are a guided wave that propagate along a fluid-solid interface such as the interface between the borehole drilling fluids and the borehole sidewall. Because they are guided waves, Stoneley waves do not suffer spherical spreading. Those waveforms are readily separated from other acoustic propagation modes on the basis of slowness, frequency and amplitude.

A typical acoustic logging tool, shown suspended in a borehole 8 in FIG. 1, consists of a mandrel 10 upon which are mounted an acoustic source 12 such as a piezo-electric mono-polar driver transducer and an array 15 including a plurality such as eight or more, monopolar receiver transducers, the first and last or which are designated as 14 and 14'. For brevity, these devices will be referred to simply as transmitter and receivers. The receivers are distributed along the length of the mandrel 10 at spaced-apart intervals such as 0.5 foot, with the lowest receiver 14 about 10 feet above source 12. Usually the lowest receiver 14 is midway between the ends 16 and 18 of mandrel 10. The mandrel includes instrumentation 17 for triggering source 12 at desired intervals, for partially processing the data downhole and for transmitting partially-processed data to the surface equipment such as control electronics 19, a programmed computer 20 and means 21 for displaying a multitrace log of borehole parameters.

Command and control signals from the surface equipment 20 are multiplexed down a cable 22 and data are returned up the cable to the surface equipment in response thereto. A standard logging cable such as 22 includes 7 conductors, a stress member and is suitably armored. Cable 22 supports mandrel 10 from a draw works 24 associated with surface equipment such as 19–21 which is electrically connected thereto by line 25. An odometer (not shown) associated with cable-guidance sheave 26, which is suspended from derrick 11, provides depth measurements for the sonde 10. Control and data signals may be transmitted in analog or digital format, but preferably digital. Caliper arms 36 and 36' provide measurements of the borehole radius as a function of depth.

In operation, the sonde 10 is preferably lowered into the borehole 8. Data are recorded as the tool is withdrawn upwards at a rate of about 0.5 ft/s or 1800 ft/hr. The source radiates an acoustic pulse preferably once per second (s). The center frequency of the pulse is customarily one kilohertz (kHz) by way of example but not by way of limitation. The flight time of a pulse from the source to the most remote receiver is but a few milliseconds (ms) so that doppler distortion of the waveforms due to upward motion will be minimal.

Fracture zones in formation 28 are shown at 30. A washout 32, to be discussed later, is shown associated with fracture 30. For purposes of this disclosure, a fracture zone may be analogous to a permeable stratum sandwiched between two impermeable strata. Drilling fluid usually fills the annulus 34 between the borehole sidewall and the sonde.

Certain acoustic properties of a fracture zone are not the same as the acoustic attributes of the competent formation above and below the fracture zone. As before stated, a Stoneley wave is a guided wave whose characteristics are controlled by the fluid-solid interface in the borehole. Stonely waves are not subject to inverse square spreading. For that reason, Stoneley waves are preferred for fracture-zone studies. A fracture zone not only provides an impedance discontinuity which gives rise to reflections but it also attenuates Stoneley waves transmitted across the zone.

U.S. Pat. No. 4,831,600, issued May 16, 1989 to Brian E. Hornby et al., entitled *Borehole Logging Method for Fracture Detection and Evaluation*, teaches a method for locating fractures in a subsurface formation by generating first signals representative of Stoneley waves from an acoustic source located on a logging tool in the borehole. A second signal is generated by an array of detectors that is representative of Stoneley waves propagating from the source that have been reflected from a fracture zone. The second signal is deconvolved with the first signal such that the time and magnitude of the peak envelope of the deconvolved signal provides an indication of the presence of the fracture zone. The magnitude of the deconvolved signal is a measure of the reflectivity of the fracture zone. Using an iterative solution for a range of widths, w, an estimated fracture-zone reflectivity is computed from the Stoneley wave frequency, Stoneley wave slowness, borehole radius and fluid viscosity. The width corresponding to the closest match of the observed and the estimated reflectivity is indicative of the fracture width.

U.S. Pat. 4,870,627, issued Sep. 26, 1989 to Kai Hsu et al., describes a *Method and Apparatus or Detecting and Evaluating Borehole* wall fractures. A borehole is penetrated by a logging tool that generates acoustic pulses and produces different receiver waveforms that are representative of acoustic waves passed through a common interval alongside the tool. From the waveforms there are selected late-arriving fracture-sensitive portions of the waveforms. From individual ones of said portions, values of a parameter are selected, such as Stoneley wave energy, that is representative of the sensitivity of respective portions of the waveform to a fracture in the borehole wall. The values of the parameter as a function of depth are compared to a threshold value. A fracture is identified within a particular depth interval when the comparisons made with the waveform portions attributable to different receivers and for a common depth in the depth interval are within a predetermined range.

Another method is taught by U.S. Pat. 4,888,740, issued Dec. 19, 1989 to Alain Brie et al., entitled *Differential Energy Acoustic Measurements of a Formation Characteristic*. This method acoustically investigates characteristics, such as fractures, of a borehole that penetrates a formation by taking differential Stoneley wave acoustic energy measurements between pairs of receivers of an array of receivers carried by the logging tool. The receivers all have the same spacing. The energy is that detected by the receivers in response to acoustic pulses generated by a transmitter spaced from the receivers on the tool. The differential energy measurements are stacked to obtain a differential stacked energy log.

The prior-art methods do not provide a reliable estimation of the fluid transport properties of a fracture zone for two reasons: First, previous models proposed assume planar boundaries at the top and bottom surfaces of the fracture and a uniform aperture. That assumption is not necessarily appropriate for describing borehole fractures with porous, tortuous conduits. Second, borehole fractures are often found associated with enlarged borehole segments, commonly referred to as washouts, which are formed while drilling through weakened, friable regions on pre-existing fracture zones. The effects of washouts are not properly compensated.

In a paper entitled *Borehole Stoneley Wave Propagation Across Permeable Structures*, published in Geophysical Prospecting, v. 41, pp 165–187, 1993, X. M. Tang et al., unlike classical authorities, teach that fracture permeability or hydraulic conductivity are the appropriate parameters to characterize fluid transport capabilities of fractures. The hydraulic conductivity is defined as integrated fluid mobility, that is, the ratio of permeability to viscosity over a selected zone of thickness H or $(\kappa_0/\mu)$ H. In the paper, the authors presented a simplified theory to account for Stoneley wave propagation across a fracture zone on the basis of one-dimensional forward modeling.

It is a purpose of this disclosure to formulate an inversion problem, based on a forward model, that may be solved from field-data measurements to evaluate the location and fluid-conducting capability of fracture zones and thin-bed permeable strata.

SUMMARY OF THE INVENTION

This invention provides a method for modeling the configuration of a fracture zone and for estimating the mobility of interstitial fluids associated with a permeable rock stratum that forms the sidewall of a borehole. An acoustic wave is propagated in the borehole from an acoustic source traversing the borehole. At respective ones of an array of receivers that are fixedly spaced apart from the source by a preselected intervals, first portions of the wavefield are detected which have been transmitted directly from the source to the receivers. Second portions of the wavefield, attributable to downgoing reflection of the wavefield from a petrophysical discontinuity, are also detected by the receivers. Caliper measurements of the borehole radius are made within the predefined depth interval. The first and second wavefield portions are filtered to isolate the directly-transmitted Stoneley wavefield from the reflected Stoneley wavefield. With the aid of a programmed computer, the filtered first wavefield portion is cross-correlated with the filtered second wavefield portion to define the depth configuration of the fracture zone. The computer is further programmed to combine parameters derived from the filtered first and second wavefields with the caliper measurements to derive a signal indicative of the hydraulic conductivity of the fracture zone.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention:

FIG. 2 schematically indicates Stoneley-wave travel paths of interest with respect to fracture zones;

FIG. 3 represents symbolically wavefield attenuation effects across a fracture zone;

FIG. 4A is an example of a raw Stonely-wave recording;

FIG. 4B is the data of FIG. 4A after low-pass frequency filtering;

FIG. 5A is a display of the directly-transmitted wavefield after velocity filtering;

FIG. 5B is a display of the reflected waves after velocity filtering;

FIG. 6 shows certain preliminary data-processing operations that may optionally be performed downhole at the logging tool;

DETAILED DESCRIPTION OF THE PREFERRED EMBODIMENT

Figure 1:
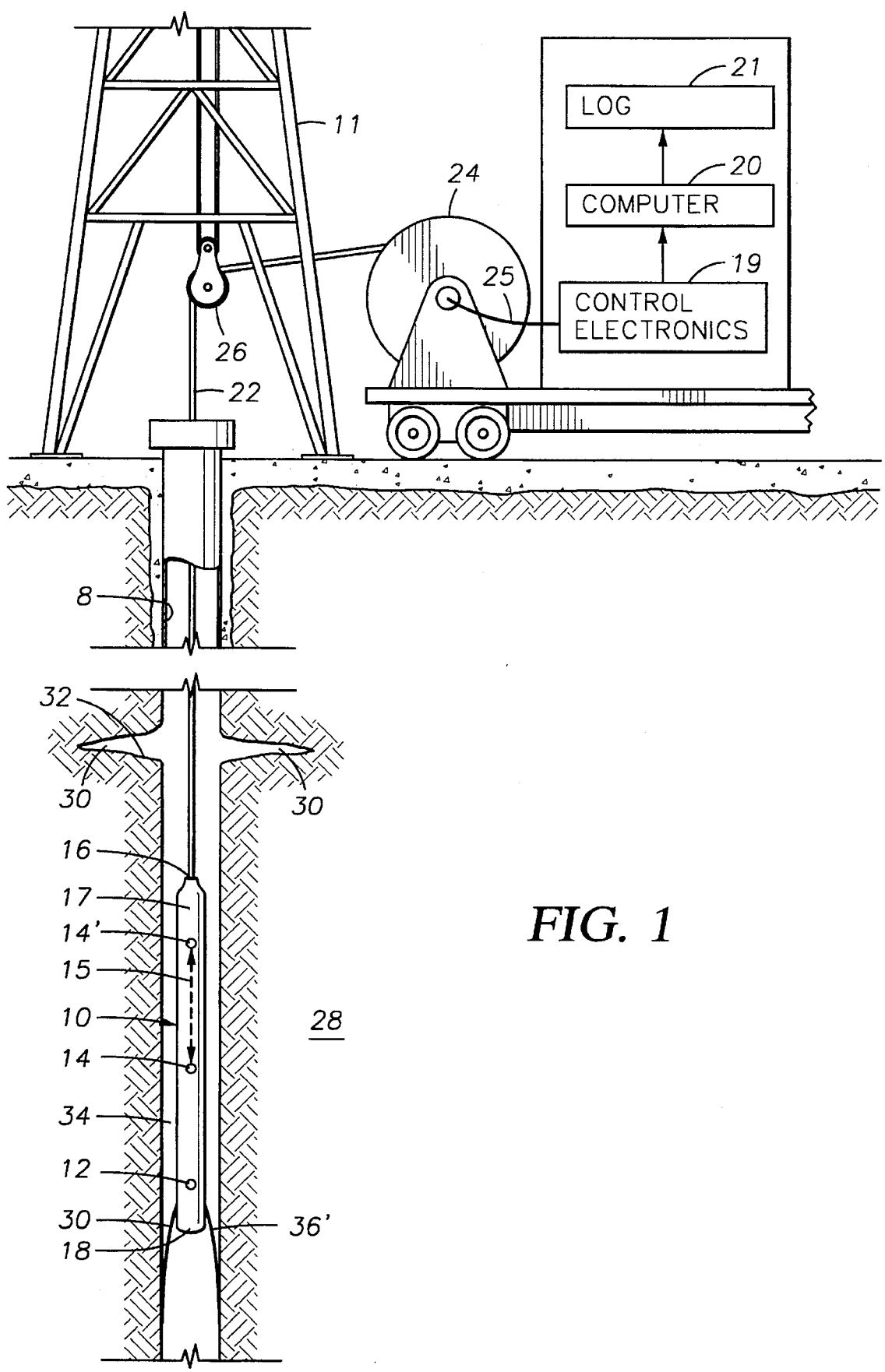
FIG. 1 shows a logging tool useful for implementing this invention emplaced in a borehole.

Please refer now to FIGS. 1–3. The features of the logging tool 10 were discussed earlier with respect to FIG. 1. FIG. 2 is a schematic sketch of the Stoneley-wave paths that are of interest. The distance L, designated by arrow 38, between transmitter 12 and lowest receiver 14 is preferably on the order of 8 to 12 feet. The array length L', that is, the separation between receivers 14 and 14' is a multiple of the receiver spacing, $\Delta d$, which is 0.5 ft, and depends upon the number of receivers, N, in the array. The array length thus is $L'=(N-1)\Delta d$.

Arrow 38 represents the trajectory of the directly transmitted wave. The transmitted wave propagates along a direct path to the respective receivers in array 15 including 14'.

Double arrow 40 is the two-way trajectory of a Stoneley wave reflected from a petrophysical discontinuity such as a fracture zone 30, FIG. 1. Double arrow 42 indicates a reflection from washout 32. Reflected arrivals will be received by all of the other receivers in array 15, including a reflected arrival at receiver 14' indicated by stub arrow 44.

The downward-traveling reflected events arriving at the respective receivers in array 15 are forward-extrapolated by time shifting to a common receiver 14, indicated by arrow 46 to form a common receiver gather. The time-shifted events are summed. The time shift is proportional to a multiple of $\Delta d/V_s$. Similarly, the upward-traveling direct waves are extrapolated by time shifting to a common receiver 14 for summing as indicated by arrow 48. The base depth level of the tool is therefore level $d_0$ to which all other depth levels are referenced.

The firing rate of transmitter 12 as previously stated, is typically once per second but it may be fired more or less often as desired. Fire control circuitry of any desired type is contained in module 17 which may be driven by commands from control electronics 19. Optional partial processing facilities may be included in controller/processor 17 which will be briefly discussed later in connection with FIG. 5.

FIG. 3 symbolizes the effect of an anomalous zone in the borehole sidewall around the fracture zone 30 and washout 32. With the transmitter 12 beneath the zone and a receiver above, the transmitted wavefield may be distorted, severely attenuated or rendered discontinuous as suggested by the squiggly line 50 in the wavefield trajectory between transmitter 12 and receiver 14.

FIG. 4A is a raw recording from a test well in the Austin Chalk of full wavefield data including Stoneley, shear and compressional waves over a 100-foot depth interval with fractures and washouts which are particularly evident at about 1830 to 1840 feet. The time base extends laterally from 0 to 5 milliseconds (ms). The transmitter was fired at 0.5-foot intervals as the sonde was drawn up the borehole. Each trace records the envelopes of the direct and reflected arrivals. What is shown is the data that are recorded at the first receiver of an eight-receiver array, for every half-foot depth decrement as will be further explained below.

FIG. 4B shows the data of FIG. 4A after frequency-domain filtering of undesired data signals above 1.5 kHz, thereby to isolate the desired Stoneley waves. A multi-cycle direct transmitted wave is indicated at 52 and extends for several cycles, obscuring any reflected wavefields that may be present. The later cycles, such as 53 may be due to reflection(s) off the end(s) of the logging tool.

Partial processing of the data may be accomplished downhole if desired, using controller/processor 17 of FIG. 1. In FIGS. 5A and 5B, the data of FIG. 4B have been velocity filtered. That is, the wavefields generated at each shot (i.e. each transmitter firing) are separated into up-and down-going waves based upon their positive and negative stepouts by slant-stacking using well-known seismic stepout-processing methods to clearly separate the transmitted direct wavefield (52 on FIG. 5A) from possible wavefields reflected from fractures.

After the wave-array data have been velocity-filtered and stacked to a common receiver, the gather of data at this receiver is further processed to obtain the direct wavefield and the reflected wavefields. This processing again is velocity filtering based upon the moveouts exhibited by the common receiver gathers to derive a common depth gathers. That is, wavefields having different origins will exhibit different moveouts. Directly-traveling events will have nearly constant very small moveout across the common receiver gather because their relative positions do not change during a logging run whereas wavefields reflected from fractures or other discontinuities will show a time slope because the position of the tool is constantly changing with respect the reflectors.

A median filter for moveout filtering is constructed. Input to the filter is a local set of M traces in the up- or down-going common receiver data. The M traces are aligned in time with small moveout to estimate the wave component at the center of the depth interval spanned by the M traces. The filter aperture depends on the spatial sampling of the input data which can be approximately estimated to be equal to the number of logging intervals in one wavelength. The filter rejects waves whose moveout across the M traces is significantly different from the aligned waves.

In FIG. 5A an estimate of the direct transmitted wavefield 52 is obtained as the mean of the filter for the up-going wave. In FIG. 5B, the down-going reflected waves 54, 56 and 58 are shown. Application of the filter to the down-going common-receiver data provides a mean wavefield. Subtracting the mean wavefield from the data results in the down-traveling reflected wavefield. The down-going reflected wavefield originates from a fracture zone above the designated common receiver of the logging tool. The break at 60 in the direct-wavefield pattern at about 1840 feet is believed to be due to a washout as well as fractures. The reflected events 56 and 58 may be reflections from the base of the washout or from fractures associated with the washout.

FIG. 6 schematically suggests optional preliminary processing circuitry that may be included in controller/processor 17 to provide the preliminary processing described in the foregoing paragraph. Partial downhole processing minimizes the volume of data bits that must be delivered through cable 22, which has a limited bandwidth, to computer 20. Optionally, of course this partial processing could be done using computer 20 installed in a service vehicle at the surface.

The analog data from each of the receivers 14–14' of array 15 are sent to a preamplifier/analog-to-digital converter 62 for quantization. The raw broadband acoustic signal registered by the receivers, such as the recording of FIG. 4A and symbolized by the waveform 64 in FIG. 6, includes all of the acoustic transients that are generated by the transmitter 12. The signals are low-pass frequency-filtered at 65 to remove the high frequency signals due to compressional and shear waves as well as logging-tool road noises thereby to isolate the desired Stoneley waves as shown in FIGS. 4B–5B and symbolized by filtered signal 66 in FIG. 6. At 68, the frequency-filtered signals, f(t) such as 67 and 69 from the respective channels of array 15 are velocity-filtered and slant-stacked, using inter-trace moveout $\Delta t = \pm \Delta d/V_a$, ad being the receiver spacing and $V_a$, the apparent Stoneley wave velocity; (+) defines up-coming waves and (−) defines down-going waves all of which is well known to the art. The stacked result, $\Sigma f(t)$, provides an enhanced waveform such as 70, clearly separated from events having different moveout velocities. Waveform 70 will be further processed as will be explained later. This preliminary processing is quite conventional and may be done either using a programmed computer 20, a downhole microprocessor or suitable electronic circuitry at the option of the user.

Thus far, the presence of a fracture zone has been qualitatively demonstrated in FIGS. 4A–5B using the foregoing processing methods. It remains now to model the formation fracture zone over a zone of interest and to quantitatively measure its economic significance.

The presently preferred best mode of operation for modeling a borehole fracture zone employs a programmed computer such as 20, FIG. 1, to convert the preprocessed digitized Stoneley-wave signals into a physical display such as a log, 21, of the borehole sidewall over a selected depth interval. The method is best explained by means of a flow diagram illustrating the respective steps of the instructions that are programmed into computer 20, next to be explained. An exegesis of the justification of this process may be found in the X. M. Tang paper that was cited earlier.

Figure 7A:
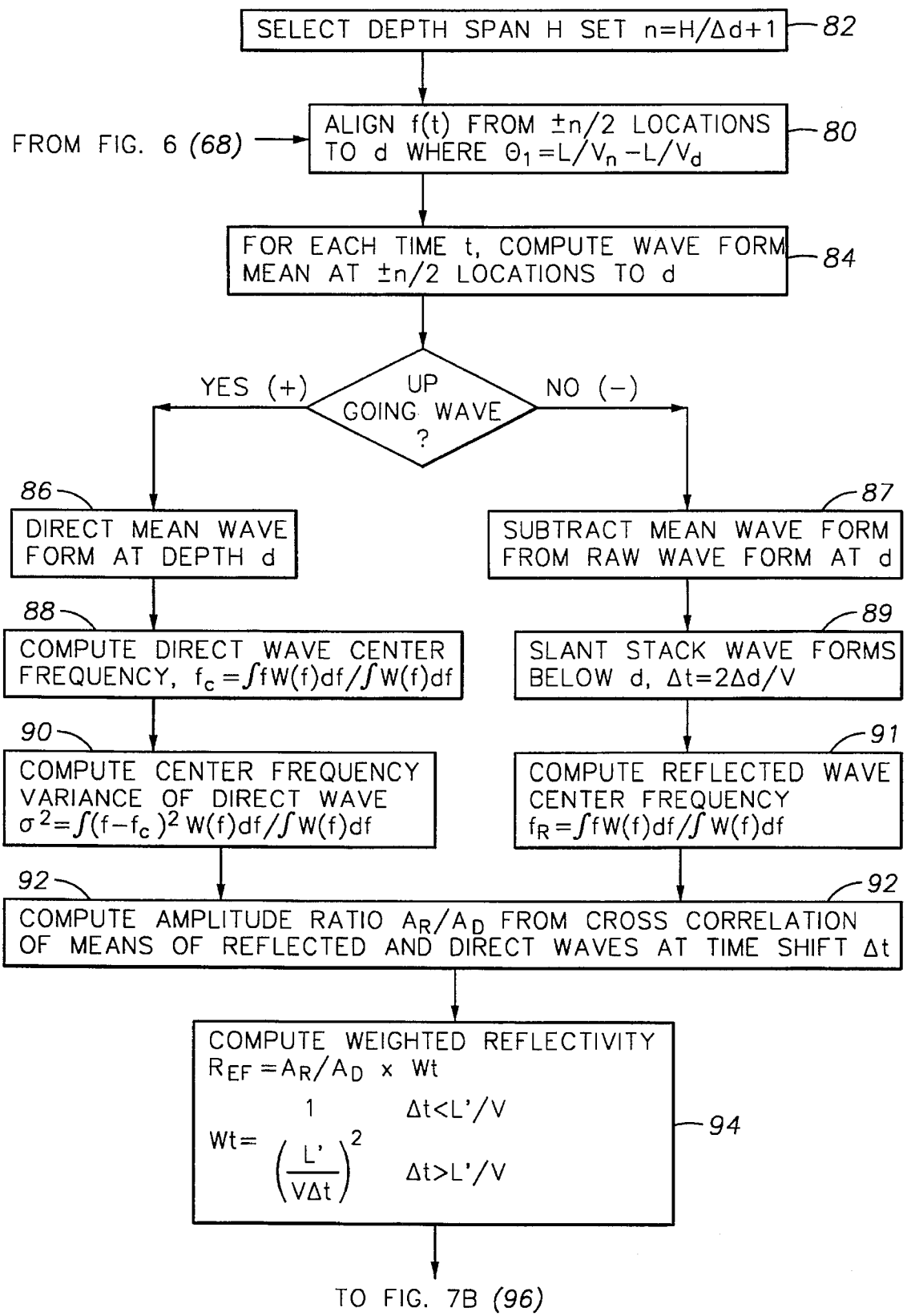
FIGS. 7A–7C constitute a flow diagram explaining the computer programming instructions required for practicing this invention.

With reference to FIG. 7A, filtered data signals, $f(t)_i$ from module 68, FIG. 6, are input to the processor 20 at step 80. A depth span $\lambda$ is selected and set $M = (\lambda/\Delta d) + 1$ at 82 where $\lambda$ is the Stoneley wavelength. Phase-shift the $f(t)_i$ from $\pm M/2$ depth locations to depth d, where the phase shift $\theta$ is determined from $\theta = L/Va - L/Vd$, L is the distance from the transmitter to the last receiver, Va is the average velocity over L and Vd is the velocity at depth d. At 84, for each time, t, compute the mean of the waveforms at the M/2 locations on each side of depth d.

From 84, the data are separated into upgoing (+) direct and downgoing (−) reflected events. At 86, the upgoing waves are averaged to define the mean direct wave emitted from the transmitter. At 88, the center frequency, $f_c$, of the direct wave is calculated weighting the frequency with the power spectrum W(f) of the direct wave. The variance, $\sigma^2$, of the center frequencies $f_c$ is calculated in the usual manner at step 90.

At step 87, the mean of the downgoing waves, representing possible waves reflected from the upper tool end and the like, are subtracted from the waveform at depth d, yielding downgoing waves that are reflected from borehole reflectors. Thereafter the resulting waveforms below d are slant-stacked where $\Delta t = 2\Delta d/Vs$ to provide an enhanced reflected wave at depth, d. At step 91, the center frequency $f_r$ of the reflected waves is calculated as in step 88 for the upgoing transmitted waves.

For each depth, d, cross correlate the reflected wavefield $f_r(t)$ with the directly transmitted wavefield $f_d(t)$ to find the amplitude ratio between the reflected and the direct wavefields, $A_r/A_d$, and the time shift $\Delta t_1$, that is required to maximize the cross correlation. A weighted reflectivity coefficient, Ref, is determined at 94 where Ref=$A_r/A_d \times$wt and $$wt = \begin{matrix} 1 & \Delta t_1 < L'/V \\ (L'/V\Delta t_1)^2 & \Delta t_1 > L'/V, \end{matrix}$$

where L' is the distance between the first and last receiver of array 15. The weighting simply means that a reflector is considered to be found if its distance to the receiver has reached the resolution limit L'. Otherwise it is considered to be away from the array and its contribution to reflectivity is weighted down in proportion to its distance to the receiver array.

At 95, the direct-wave reference center frequency is derived from an unfractured portion of the borehole to provide a direct-wave reference frequency $f_o$. The quantities V, Ref, $\sigma^2$, $f_c$, $f_r$ and $f_o$ are now assembled in register 96 for use in later processing. Steps 80 through 96 are executed for all depths of interest.

Figure 7B:
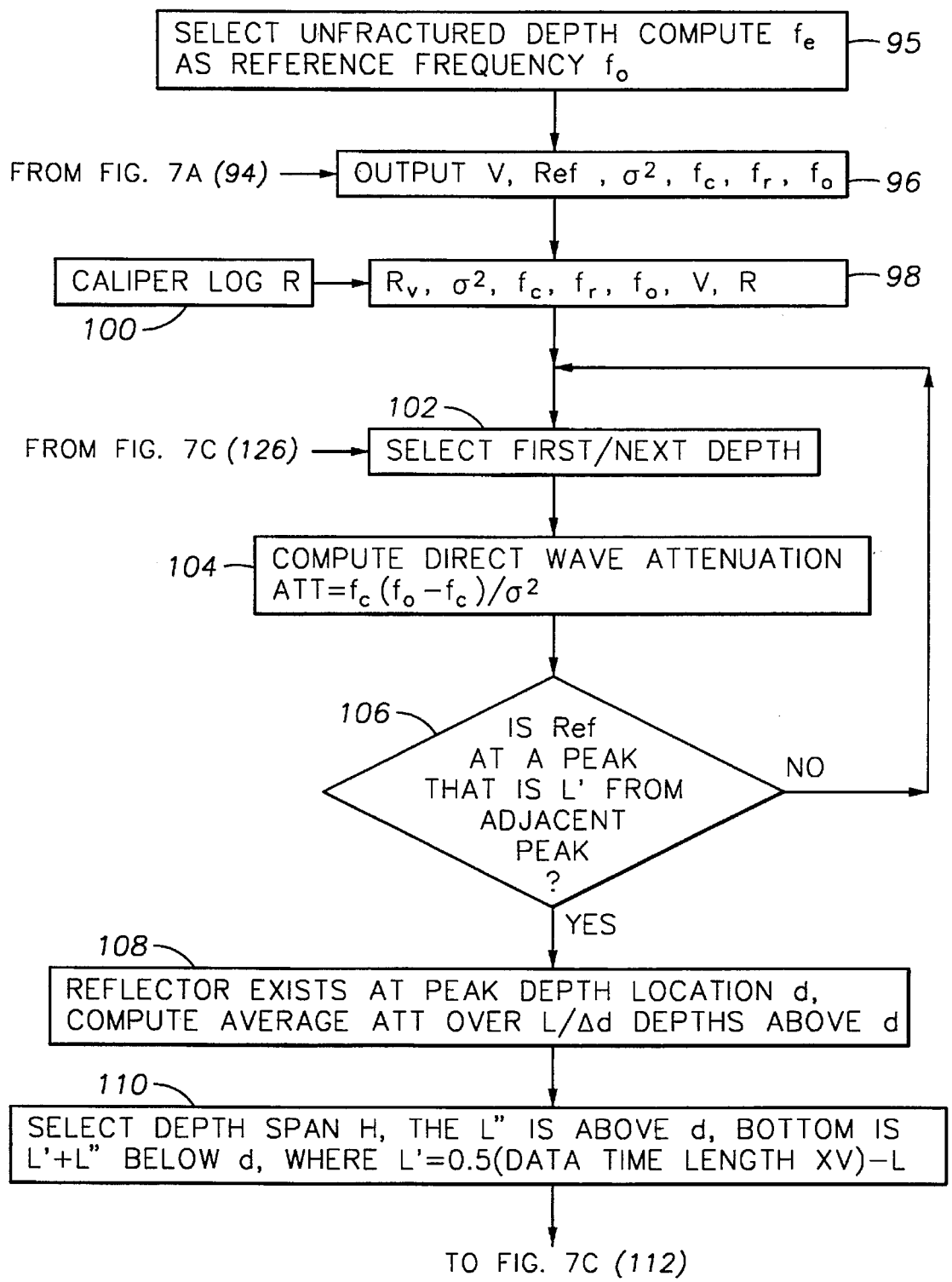

The quantities from register 96 in computer 20 are transferred to an input buffer 98, computer 20, FIG. 7B for use in constructing a well log 21 (FIG. 1) that models the fracture zone in the borehole sidewall over a region of economic interest. Additionally, the hydraulic conductivity is evaluated. As mentioned earlier, it is important in the calculations that variations in the borehole diameter be properly accounted for. Accordingly, discrete borehole radii, R, as a function of depth, d, from a caliper log at step 100, are also entered into input buffer 98.

Having selected an arbitrary first depth, d, at 102 the average attenuation of the direct wave over the transmitter-to-receiver distance, is computed at step 104 from Att=$f_c(f_o - f_c)/\sigma^2$. The data are tested at step 106 for a peak in Ref that is L' distant from adjacent peaks. If false, the next depth level is examined. If true, a reflector exists at peak depth-location d as shown at 108. The average value of Att is computed for L/$\Delta$d depths above the reference depth d.

At 110, select a depth span D whose top lies L" above depth d and whose bottom lies L'+L" below d, where $$L'=0.5(\text{data-time length} \times V) - L'.$$

Figure 8A:
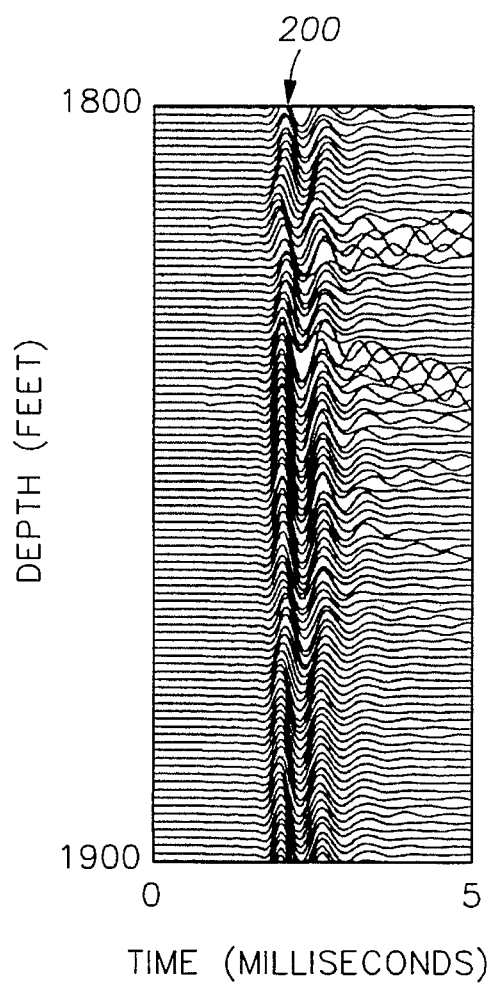
FIGS. 8A and 8B are examples of a synthetic directly-transmitted wavefield and a synthetic reflected wavefield.
Figure 8B:
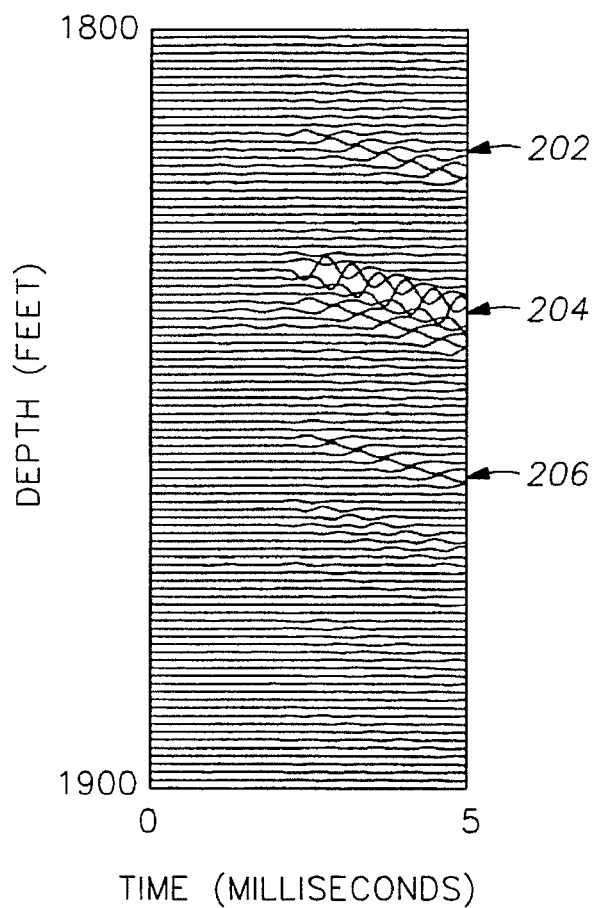

At 112, divide depth span D into $(L'+2L'')/\Delta d$ cylinders, each having a radius R, the instantaneous value for the radius R being provided by the local caliper reading. The nominal borehole radius is, of course an average of a the caliper readings along a designated depth interval. At step 114, for each depth increment $\Delta d$, develop a model or synthetic waveform of the direct and reflected Stoneley waves at depth d, due to a source located a distance L' beneath d, for each caliper measurement R, proceeding as follows:

In a fluid-filled borehole, the Stoneley wave is characterized by wave pressure p and axial displacement u. A propagator matrix can be defined for the displacement-vector $(u\ p)^t$ between two locations in the borehole as $$\begin{pmatrix} u \\ p \end{pmatrix}_{z_1} = \left( \prod_{N=1}^{n=N} G_n \right) \begin{pmatrix} u \\ p \end{pmatrix}_{z_2}, \quad (1)$$

where N is now the number of cylinders between $z_1$ and $z_2$. The propagator matrix $G_n$ at the boundary between the nth and the (n−1)th cylinders is given by $$G_n = \begin{pmatrix} \dfrac{A_n}{A_{n-1}} \cos(\omega d/V_n) & -\dfrac{A_n}{A_{n-1}} \sin(\omega d/V_n)/\rho\omega V_n \\ \rho\omega V_n \sin(\omega d/V_n) & \cos(\omega d/V_n) \end{pmatrix}, \quad (2)$$

where V is the Stoneley wave velocity in the nth cylinder, p is the borehole fluid density and $A_n$ and $A_{n-1}$ are the cross sectional area of the fluid annuli between the tool and the borehole sidewall for the nth and the (n−1)th cylinders respectively. A is determined directly from the local borehole radius. The above formulation accounts for variations in the borehole radius due to washouts and the like. The displacement/pressure vectors at the upper and lower boundaries of the cylinder containing the transmitter are related to the wave excitation of the transmitter through the following equation $$\begin{pmatrix} -iZ & 1 \\ iZ & 1 \end{pmatrix} \begin{pmatrix} u \\ p \end{pmatrix}_{upper} + \quad (3)$$

$$\begin{pmatrix} ize & e \\ -iz/e & 1/e \end{pmatrix} \begin{pmatrix} u \\ p \end{pmatrix}_{lower} = S(\omega) \begin{pmatrix} e^{i\omega d_1/V} \\ -e^{-i\omega d_1/V} \end{pmatrix}, \quad (4)$$

where Z=ωpV, e=exp (iωd/V), S(ω) is the transmitter excitation spectrum, $d_1$ is the distance between the transmitter and the upper cylinder boundary and V is the Stoneley wave velocity within the cylinder. Using the above three formulations, a synthetic model for the direct wave can be created at step 114 for use as a reference, which accounts for local environmental conditions in the borehole. An example of a total-field synthetic log, 200, is given in FIG. 8A and an example for downgoing down-going waves, 202, 204, 206 only, in FIG. 8B.

Figure 7C:
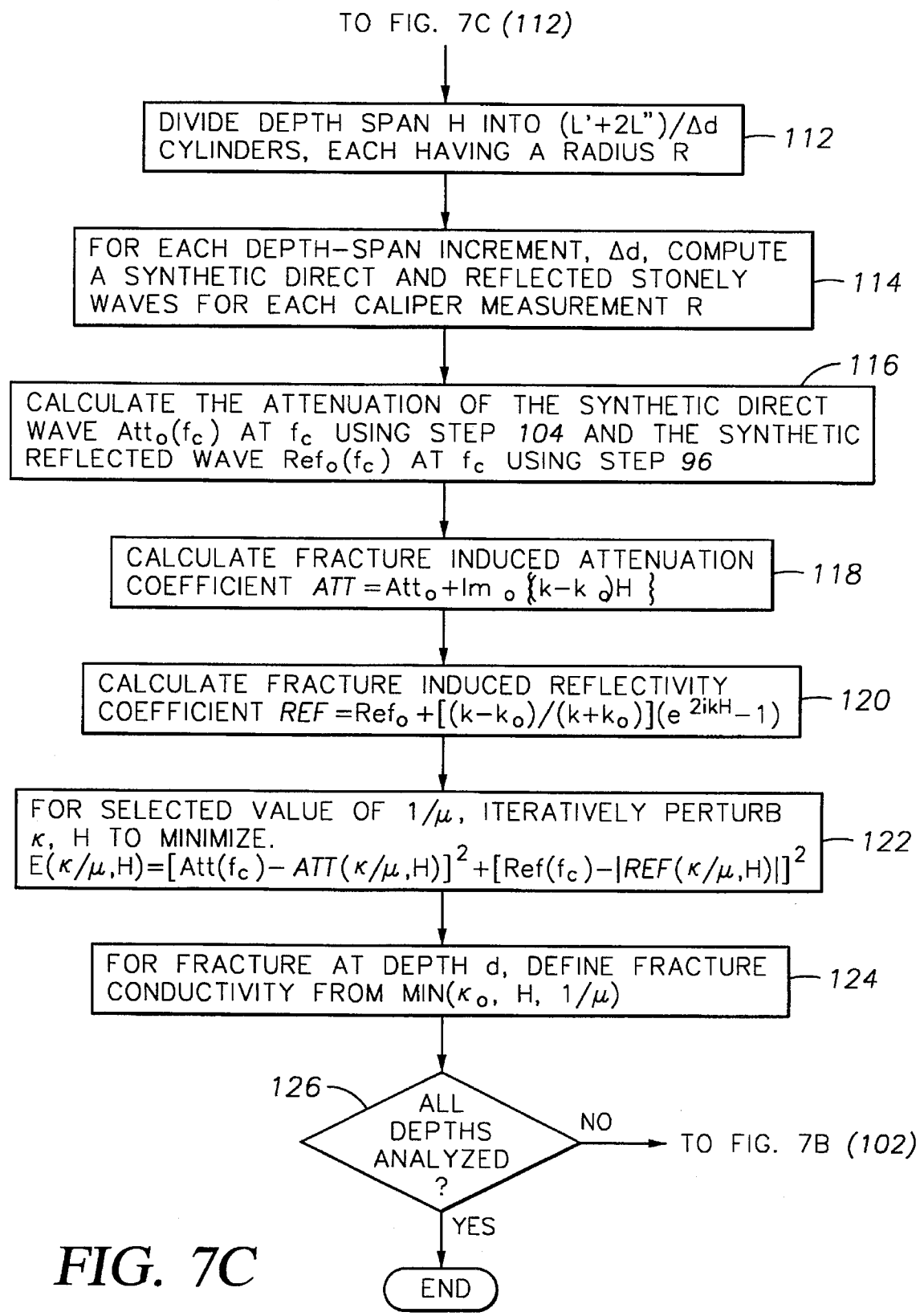

Proceeding on to FIG. 7C, taking the synthesized direct wavefield, a reference attenuation, $Att_o$, induced by the borehole caliper change, is calculated using the process shown in step 104. Next, the reflectivity coefficient $Ref_0$, induced by the caliper change is derived as in step 94.

A total attenuation ATT is derived at step 118 from $$ATT = Att_0 + Im\{(k-k_0)H\}, \quad (4)$$

and a total reflectivity coefficient is computed at 120 from $$REF = Ref_0 + [(k-k_0)/(k+k_0)](e^{2ikH}-1), \quad (5)$$

where Im {−} denotes taking the imaginary part of the complex quantity in {} and k is the flow-induced Stoneley wavenumber. $k_0$ is the wavenumber unrelated to flow into fractures but includes washout effects. $Att_0$ and $Ref_0$ denote the attenuation and reflectivity coefficients of the direct wave due to effects other than fracture zone permeability (i.e. washouts).

The hydraulic conductivity of the fracture zone that was defined at depth d, in step 108 is derived at step 122 by minimizing a quantity E(κ/μ, H) by iteratively perturbing κ/μ and H in the formulation $$\min E(\kappa/\mu,H) = [Att(f_c)-ATT(\kappa/\mu,H)]^2 + [Ref(f_c)-|REF(\kappa/\mu,H)|]^2 \quad (6)$$

where κ is the permeability, μ is the viscosity of fluids in fractures and H is the thickness of the fracture zone or permeable stratum. For a fracture at depth d, a measure of the hydraulic conductivity is defined as the product κH/μ where κ/μ and H minimize E(κ/μ,H) as stated at 124. An initial iteration might insert a value of 1 darcy for κ, 1 pascal/second for μ and 1 meter for H.

At step 126, the program loops back to step 102 until all depths have been analyzed.

Figure 9:
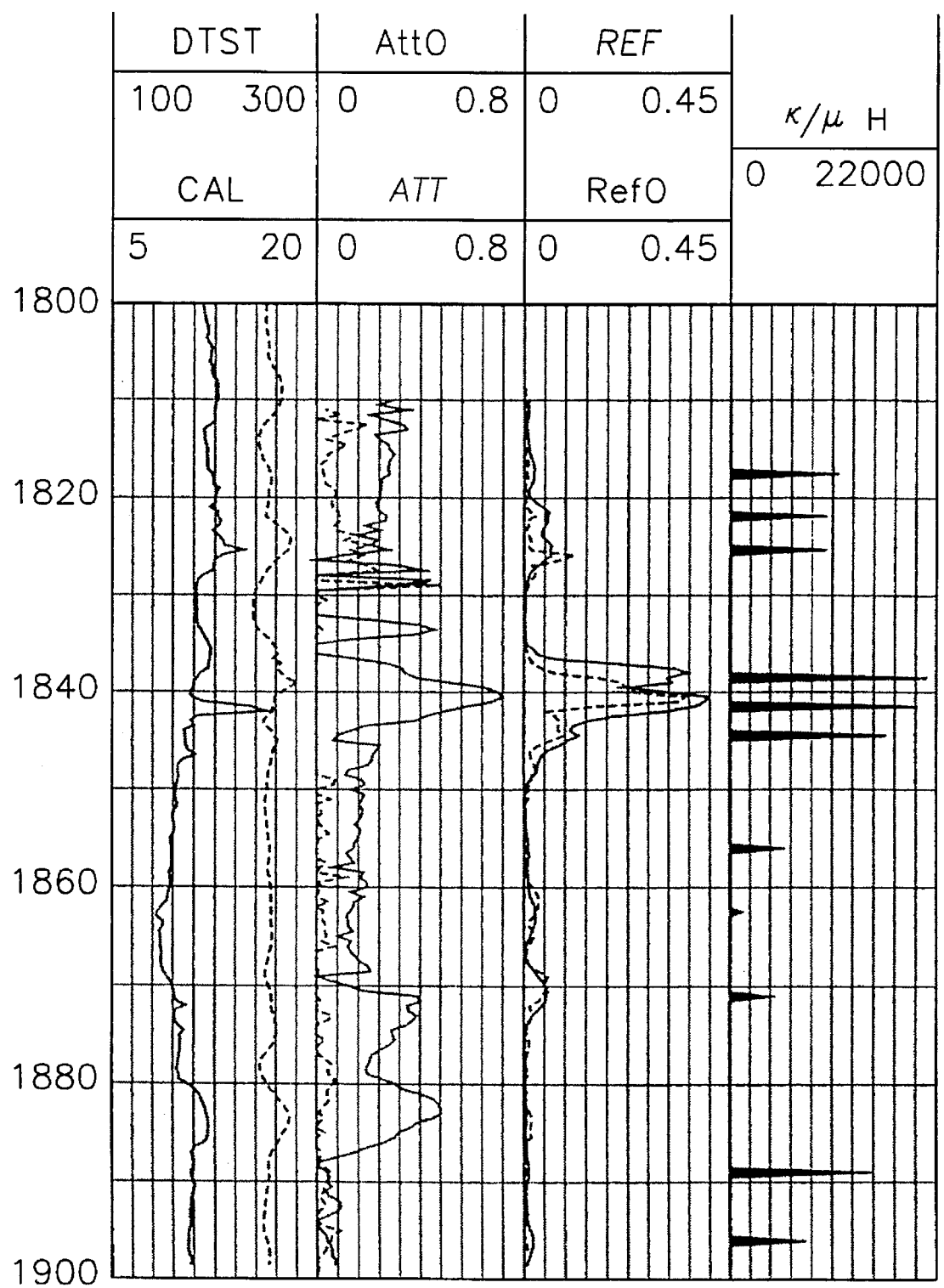
FIG. 9 is a borehole log prepared by the method of this invention, showing a number of fracture zones and the hydraulic conductivity associated therewith.

FIG. 9 shows a fracture-zone model, corresponding to the LOG 21 of FIG. 1, of the borehole sidewall and a hydraulic conductivity estimate as a function of depth as determined from the data shown in FIGS. 4A–5B. The first track 220 shows the caliper log and the Stoneley wave slowness log, 222 $1/V_s$, that were used to model the synthetic direct waveform as implemented at step 114 of the flow diagram in FIG. 7B and as exhibited in FIGS. 8A and 8B. The caliper measurements provide the information needed to correct for borehole diameter changes due to washouts, something that was not done in the prior art. Trace 2 shows the measured Stoneley wave attenuation, ATT, solid line, 226 and the synthetic wave attenuation ATT0, dashed line. 224 Trace 3 shows the measured reflectivity Ref dashed line 228 for real data, solid line 230 and Ref0 for synthetic data. Observe the good correspondence. Substituting the reflectivity and attenuation data in (5), the fracture hydraulic conductivity is estimated for each individual fracture interval identified from the REF log. The conductivity values κH/μ, where κ is the permeability and μ is the viscosity, are shown in trace 232.

The conductivity values are not directly proportional to the measured reflectivity but are jointly determined from the reflectivity, attenuation, borehole washout condition and the frequencies of the transmitted direct and the reflected wave data.

This invention has been described with a certain degree of specificity by way of example but not by way of limitation. For example, it has been assumed that the Stoneley waves were reflected from discrete fractures of fracture zones. Stoneley waves may be reflected from any type of petrophysical discontinuity that may exist in the borehole. Those skilled in the art will devise obvious variations to the examples given herein but which will fall within the scope and spirit of this invention which is limited only by the appended claims.

What is claimed is:

1. A method for modeling the location of a petrophysical discontinuity encompassed within a predefined depth span along the sidewall of a borehole and for estimating the mobility of interstitial fluids associated with said discontinuity, comprising:

propagating an acoustic wavefield, characterized by a preselected excitation frequency, in said borehole from an acoustic source traversing said borehole;

at respective ones of an array of receivers fixedly spaced apart from said source at preselected depth increments, detecting signals representative of first portions of said acoustic wavefield that have been transmitted directly from said source to said receivers;

at said receivers, detecting signals representative of second portions of said acoustic wavefield attributable to reflection of said second wavefield portions from a petrophysical discontinuity;

providing caliper measurements of nominal and of actual borehole radii at discrete depth levels along said predefined depth interval;

filtering the received signals representative of the first and second acoustic wavefield portions to separate an upwardly-propagating directly-transmitted Stoneley wavefield from a downwardly-propagating reflected Stoneley wavefield;

providing instructions for programming a computer for cross-correlating the directly-transmitted Stoneley wavefield with the reflected Stoneley wavefield to model the depth configuration of the petrophysical discontinuity within said predefined depth interval;

with the aid of said programmed computer, combining selected parameters of the directly-transmitted Stoneley wavefield, selected parameters of the reflected Stoneley wavefield and the caliper measurements to derive a signal indicative of the hydraulic conductivity of said petrophysical discontinuity.

2. The method as defined by claim 1, wherein: the step of filtering the first and second wavefield portions includes the steps of (a) low-pass filtering, in the frequency domain, the signals representative of the first and second wavefield portions, (b) velocity-filtering, in the time domain, the low-pass filtered wavefield signal portions to form a common receiver gather indexed to a preselected discrete depth step, and (c) velocity filtering a plurality of common receiver gathers that reside within the preselected depth span to form a common depth gather.

3. The method as defined by claim 2, comprising the further steps of:

from a region in said borehole that is outside said preselected depth interval, measuring a reference frequency and a reference wavenumber $k_0$ for a directly-transmitted Stoneley wavefield;

within said preselected depth interval, defining a center frequency and its variance from a power spectrum of a directly-transmitted Stoneley wavefield averaged over all frequencies and a corresponding flow-induced wavenumber, k;

instructing said computer to calculate an attenuation coefficient statistic, Att, from said reference frequency and said center frequency;

forming a reflectivity coefficient, Ref, from the weighted ratio between the nominal and instantaneous borehole radii;

providing instructions to said computer for creating synthetic models of a directly-transmitted Stoneley wavefield and of a reflected Stoneley wavefield;

from the synthetic models, calculating a reference attenuation coefficient $Att_0$ and a reference reflectivity coefficient $Ref_0$;

calculating a flow-induced attenuation and forming a total attenuation coefficient using $$ATT=Att_0(f_c)+Im\{(k-k_0)H\},$$

a flow-induced reflectivity and forming a total reflectivity coefficient from $$REF=Ref_0(f_c)+\{(k-k_0)/(k+k_0)\}(e^{2ikH})$$

and minimizing $$E(\kappa/\mu,H)=[Att-ATT(\kappa/\mu,H)]^2+[Ref-|REF(\kappa/\mu,H)|]^2$$

by iteratively perturbing $\kappa/\mu$, H.

4. The method as defined by claim 2 wherein the step of velocity filtering is performed in the frequency domain.

* * * * *

UNITED STATES PATENT AND TRADEMARK OFFICE
CERTIFICATE OF CORRECTION

PATENT NO. : 5,616,840
DATED : April 1, 1997
INVENTOR(S) : Xiaoming Tang

It is certified that error appears in the above-identified patent and that said Letters Patent is hereby corrected as shown below:

<u>Column 12,</u>
Line 2, please delete "Att" and replace with -- $Att_0$ --
Line 4, please delete "Ref" and replace with -- $Ref_0$ --
Line 22, please delete formula "$REF=Ref_0(f_c)+\{(k-k_0)/(k+k_0)\}(e^{2ikH})$"
and replace with -- $REF=Ref_0(f_c)+\{(k-k_0)/(k+k_0)\}(e^{2ikH}-1)$ --
Line 25, please delete formula "$E(\kappa/\mu, H)=[Att-ATT(.\kappa/\mu, H)]^2 + [Ref - | REF(\kappa/\mu, H) |]^2$"
and replace with -- $E(\kappa/\mu, H)=[Att(f_c)-ATT(.\kappa/\mu, H)]^2 + [Ref - | REF(\kappa/\mu, H) |]^2$ --

Signed and Sealed this

Fifteenth Day of June, 2004

JON W. DUDAS
*Acting Director of the United States Patent and Trademark Office*